March 3, 1964

E. R. LIEBERMAN 3,123,482

EDIBLE COLLAGEN CASINGS AND PROCESS
OF MANUFACTURING THE SAME

Filed Jan. 16, 1961

INVENTOR
EMANUEL. P LIEBERMAN
BY Robert W. Kell
ATTORNEY

March 3, 1964

E. R. LIEBERMAN 3,123,482

EDIBLE COLLAGEN CASINGS AND PROCESS
OF MANUFACTURING THE SAME

Filed Jan. 16, 1961

INVENTOR
EMANUEL R. LIEBERMAN
BY
Robert W. Kell
ATTORNEY

March 3, 1964  E. R. LIEBERMAN  3,123,482
EDIBLE COLLAGEN CASINGS AND PROCESS
OF MANUFACTURING THE SAME
Filed Jan. 16, 1961  6 Sheets-Sheet 4

INVENTOR
EMANUEL R. LIEBERMAN
BY Robert W. Kell
ATTORNEY

March 3, 1964 E. R. LIEBERMAN 3,123,482
EDIBLE COLLAGEN CASINGS AND PROCESS
OF MANUFACTURING THE SAME
Filed Jan. 16, 1961 6 Sheets-Sheet 5

INVENTOR.
EMANUEL R. LIEBERMAN
BY Robert W. Kell
ATTORNEY

3,123,482
EDIBLE COLLAGEN CASINGS AND PROCESS OF MANUFACTURING THE SAME
Emanuel Roy Lieberman, Somerville, N.J., assignor to Johnson & Johnson, a corporation of New Jersey
Filed Jan. 16, 1961, Ser. No. 82,935
11 Claims. (Cl. 99—176)

This invention relates to reconstituted collagen articles in which the collagen fibrils are in a novel structural condition and relationship, and more particularly, to extruded collagen tubes having such novel structure.

While not limited thereto, one embodiment of the invention is particularly adapted to be utilized as an edible food casing, for example, as a casing for fresh pork sausages which must be cooked by the consumer, or as a casing for sausages of the wiener or frankfurter type. The latter sausages are generally processed by being smoked and cooked by the packer and are generally reheated before they are consumed. When sausages are provided with edible casings, it is unnecessary to remove the casing before the sausage is eaten. Since time immemorial, the only commercially satisfactory edible sausage casings have been the natural casings.

Natural casings, as distinguished from artificial or synthetic casings, are prepared from the intestines of edible animals, such as cattle, swine and sheep. After the intestines are removed from the carcass, food, manure, and other matter in the intestines are removed by means of stripping rollers. Thereafter, by appropriate means, the gut slimes within the casing are broken down and removed.

Natural casings suffer from a number of disadvantages. Tender edible casings can be obtained from sheep intestines, but because of the limited supply and difficulties involved in preparation, such casings command a high price. Casings made from the cleaned intestines of other animals are frequently tough and unpleasant to eat. This is generally true of casings made from hog and beef intestines, but is also frequently the case with casings made from sheep intestines. Because of the biological structure of intestines and the manner in which casings are processed, holes or openings in the casing wall are usually present. In addition, the wall thickness and diameter of natural casings vary considerably, causing difficulty during modern high speed stuffing.

In view of these and other deficiencies of natural casings and the expense of preparing such casings for human consumption, many attempts have been made to prepare a better edible casing. Such attempts have met with but limited success for reasons that can now be attributed at least in part to the particular form of collagen used as a starting material.

Collagen tissues such as hide and tendon, although quite different in morphology, fundamentally share several levels of structure in common. The smallest structural unit is generally called tropocollagen. It is the hypothetical rod-shaped primary building block of the collagen fibrils, soluble in dilute aqueous salt solution, measuring about 15 angstroms in diameter and about 3000 angstroms in length. The collagen fibril, made up of many thousands or even millions of tropocollagen units, constitutes the next largest structural unit of collagenous tissues.

The collagen fibrils as found in cowhide in the completely dehydrated state are about 50 to 1000 angstroms in diameter and of varying length. Cowhide collagen fibrils measuring 20,000,000 angstroms (2 millimeters) in length have been observed.

The collagen fibrils in bovine hide are arranged in bundles to form collagen fibers that vary in length and measure many thousands of angstroms in diameter. Cowhide collagen fibers have been observed which measure about 10,000 to 20,000 angstroms in diameter in the dehydrated state but larger collagen fibers measuring as much as 1000 microns in diameter in their dehydrated state are believed to exist. Each collagen fiber contains hundreds or even thousands of fibrils, all bound together by a sheath. The collagen fibers, in turn, are organized into bundles of collagen fibers that are large enough to be seen by the naked eye and form the familiar fibrous network visible in hides of all sorts.

Normally, free tropocollagen units are not present in cowhide to any appreciable extent. Thus, for all practical purposes, the basic structural unit of cowhide tissues can be considered to be the collagen fibril. The present invention depends upon the use as a raw material of these collagen fibril units in a hydrated and swollen condition, freed of their normally associated sheath. In accordance with the present invention, hydrated swollen cowhide collagen fibrils freed of their normally associated sheath and measuring from about 2000 to about 15,000 angstroms in diameter are extruded to form articles having the desired shape. The shaped article is then treated in a manner to deswell and dehydrate the individual collagen fibril units. When the unsheathed individual collagen fibrils in the shaped product lose their excess water of hydration by air-drying, they cohere to form a translucent hyaloid substance in which the boundary line between individual fibrils can not be distinguished even in the electron microscope.

It has heretofore been proposed to produce an artificial collagen casing from fibrous animal material such as, for example, dehaired hide which has been subjected to conventional liming treatments. Collagen in such limed fibrous material is converted by mechanical disintegration and the swelling action of acids into a paste of fiber bundles and fibers, which is then extruded to form a tube. Such paste or pasty mass commonly has a solids content in the order of 10% to 25%, although in some cases the solids have been as low as 8%. These pastes are extruded under relatively great pressures of the order of hundreds of atomspheres. Under the conditions of the aforesaid process, the mechanical and chemical action does not reduce the coarse collagen fibers and fiber bundles to their smaller basic fibrillar units. Consequently, many problems were experienced because of the unsatisfactory properties contributed by the large collagen fibers.

One difficulty caused by the large size of the swollen collagen fibers is a tendency to become oriented in a single direction during extrusion. Orientation of coarse collagen fibers and fiber bundles in a particular direction throughout the entire thickness of the casing is undesirable because the casing is readily split or torn. Although the tear strength of an extruded collagen casing may be improved if the collagen fibers are randomly oriented by a tangling, matting or felting action, the haphazard arrangement of fibers and fiber bundles that is obtained by such prior art methods has not produced a satisfactory product. The relatively large size of the collagen fibers in the extrudable dispersions of the prior art make it extremely difficult to extrude a homogeneous casing. Moreover, the tubes so produced are relatively thick, tough, difficult to masticate and shrink excessively on cooking, thereby extruding the meat. These deficiencies appear to result, at least in part, from the large fibers and fiber bundles present throughout the casing wall.

It is an object of the present invention to produce new and improved collagen articles that are substantially free of collagen fibers and collagen fiber bundles.

It is another object of this invention to provide an edible collagen film or membrane adapted to be used in the packaging of foods.

It is a further object of this invention to produce a continuous extruded collagen tube in which the basic building blocks that make up the tubular structure are cowhide collagen fibrils cohered to form a hyaloid continuous film or membrane as distinguished from collagen fibers.

It is also an object of this invention to provide an extruded collagen casing in which the individual collagen fibrils are randomly arranged and lie in a plane that is parallel to the surface of the casing wall.

Still another object of this invention is to provide a homogeneous translucent extruded collagen casing of uniform diameter and wall thickness.

In accordance with the present invention, cowhide is treated with an aqueous solution of a non-toxic acid under conditions that swell and rupture the sheath surrounding the collagen fibers. The unsheathed fibrils are then formed into the desired shape or configuration, after which the liberated swollen collagen fibrils in the shaped articles are cohered. The articles so obtained comprise cohered collagen fibrils that are substantially free of collagen fibers.

Swollen collagen fibrils substantially free of collagen fibers may be extruded in any desired shape into a coagulating bath which acts to deswell and dehydrate the unsheathed collagen fibrils and thereby provide the extruded article with the requisite strength to withstand subsequent handling. The extruded product, which at this step in the process is made up of deswollen unsheathed collagen fibrils and substantially free of coarse collagen fibers, is treated with a hardening agent such as alum and is then washed free of salts. Finally, the article is air-dried thereby causing the collagen fibrils to cohere and form a translucent hyaloid structure in which the individual collagen fibrils can not be distinguished, optically.

In preparing the mass of swollen collagen fibrils from which the articles of the present invention are formed, it is important that the ratio of collagen tissue solids to swelling liquid be much lower than that heretofore used, i.e., it should be of the order of at least 2.5% and less than 6%, preferably about 3.5% to 5%. It has been observed that collagen fibrils in unlimed cowhide will swell to more than 100 times their original volume if comminuted cowhide, progressively reduced in particle size to very small dimensions, is placed in a sufficient quantity of weak acid solution, such as 1.2% lactic acid in water. The pressure of the swelling of the constituent fibrils will rupture the relatively inelastic fiber sheath that surrounds the bundle of fibrils, thus destroying the identity of the fiber. The swollen collagen fibrils may, if desired, be separated from remnants of the fiber sheath by filtration.

It must be emphasized that to achieve disruption of the fiber structure by swelling, the ratio of collagen to swelling liquid must be low. Thus, if the amount of collagen tissue in the acid swelling liquid exceeds about 6% by weight, the original fiber structure is not appreciably altered. There is also evidence that the fibers in limed hide are not disrupted as readily as the fibers in fresh (salted or frozen) hides. The preferred starting material for the products of the present invention, therefore, are fresh (i.e., unlimed) hide such as unlimed cowhide. While bovine tendon has heretofore been used as a source of collagen tissue, the collagen fibrils derived from tendon differ from fresh cowhide fibrils. Sausage casings that are made of tendon collagen fibrils shrink on cooking and extrude the meat.

A suitable acid solution that may be used to swell the unlimed cowhide for the purposes of this invention is an aqueous solution containing about ½ to 2% lactic acid. The mass of swollen collagen fibrils used as a starting material in the manufacture of the sausage casings of the present invention contain from about 2.5% to about 6% of collagen tissue solids on a dry-weight basis. If the concentration of collagen is below about 2.5%, the extruded tube is very soft and difficult to handle. When the amount of collagen tissue exceeds about 6%, the collagen mass contains an appreciable proportion of coarse collagen fibers rendering the mass so viscous that extrusion is extremely difficult. Moreover, if coarse collagen fibers and fiber bundles are present in the extruded mass, these large fibers do not fuse together to form a satisfactory casing.

It will be understood that the foregoing general description and the following detailed description, as well, are exemplary and explanatory but do not restrict the invention.

The process for the manufacture of extruded collagen articles of the present invention may be more fully understood from the following detailed description and examples taken in connection with the accompanying drawings wherein.

Throughout the specification and examples that follow, all quantities are expressed in parts by weight unless otherwise indicated.

EXAMPLE I

*Preparation of the Swollen Unsheathed Collagen Fibrils*

Fresh steer hides are washed with cold water at 13° C. or less in a rotating drum for 10 to 24 hours. After washing, the hides are defleshed with a scraping machine and the hair and epidermis are cut off with a horizontal band knife. This preliminary cleaning is accomplished with standard tannery equipment.

The remaining hair and poorly cleaned sections are cut off by hand and discarded. Composites are prepared from five hides. The hide composites are then cut into ½ to 4 square inch sections and reduced to pulp by three passes through a meat grinder, each pass being a finer grind. The first and second passes are through 18 and 8 millimeter holes respectively. The final grind is through holes 1.5 millimeters in diameter. It is desirable during the grinding process to keep the pulp below 20° C. This may be done by adding crushed ice to the hides as they are fed to the grinder.

The ground pulp is next diluted with tap water at 16° C. to give a smooth slurry containing 7.4% dry solids. This slurry (125 parts) is then treated with 125 parts of a 2.4% lactic acid solution using an inline mixer to form a homogeneous mass of swollen collagen fibrils. It is important during this acid swelling step that the temperature be maintained below about 25° C. The mixture so obtained contains 3.7% hide solids and 1.2% lactic acid. After the pulp is blended with acid, the mass of swollen collagen fibrils is further dispersed in a suitable homogenizer fitted with a 2-stage valve and operated with a 1500 p.s.i. drop per stage. The swollen collagen fibrils are then filtered through a 7-mil filter screen to remove non-swellable tissue fragments and any large fibers or fiber bundles that may remain.

EXAMPLE II

*Extrusion of the Swollen Collagen Fibrils*

Figure 1:
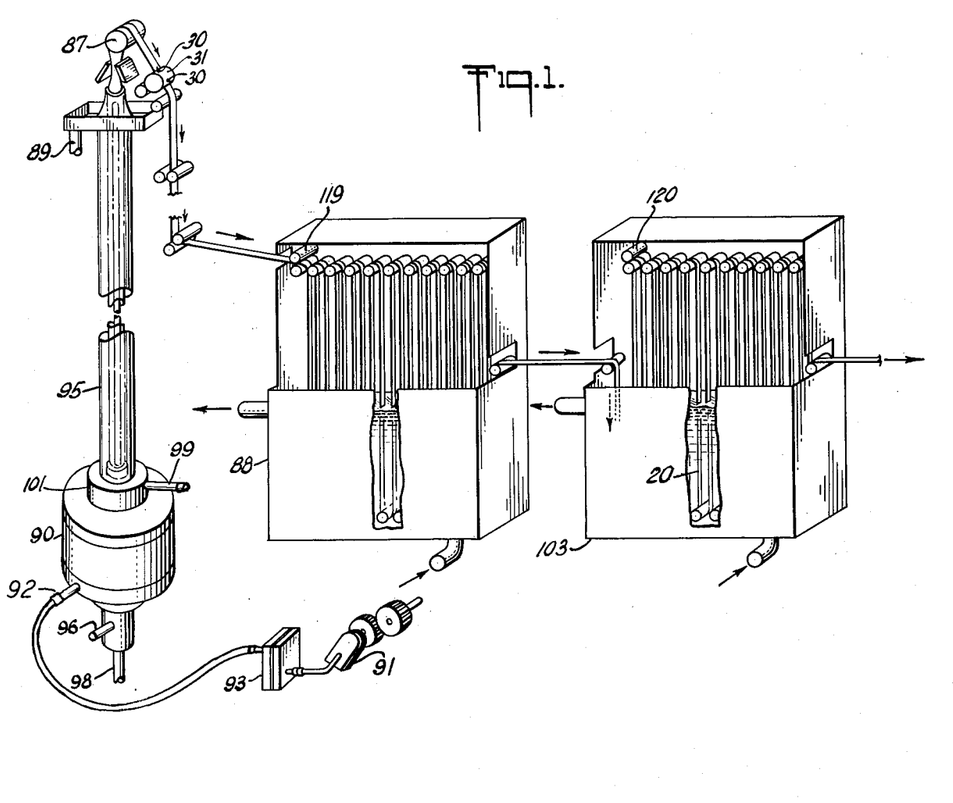
FIGURES 1 and 2 are flow diagrams illustrating the sequence of steps in the continuous manufacture of a collagen casing in accordance with the present invention.

Referring to FIGURE 1, it will be noted that a suitable metering pump 91 is employed to extrude a homogeneous mass of swollen collagen fibrils through screen filter 93 and the entry port 92 of extruder 90 into a coagulating bath circulating through a vertical column 95. The extrusion apparatus 90 used for the manufacture of the casings of the present example may be a disk extruder of the type illustrated in FIGURES 1 and 3, which type of extruder is further described and claimed in the copending application filed as of even date herewith (Ethicon 149), Serial No. 82,933, filed January 16, 1961.

Figure 4:
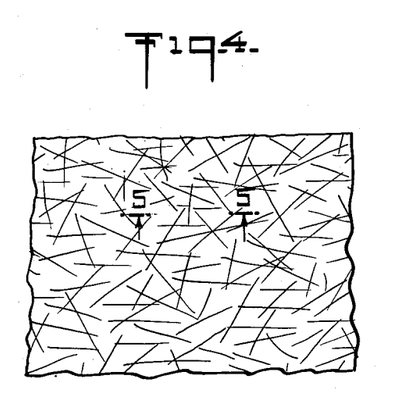
FIGURE 4 is a diagrammatic, greatly enlarged plan view of the surface of an extruded casing of the present invention, illustrating what appears to be a random distribution of collagen fibrils parallel to the surface of the casing wall.
Figure 5:
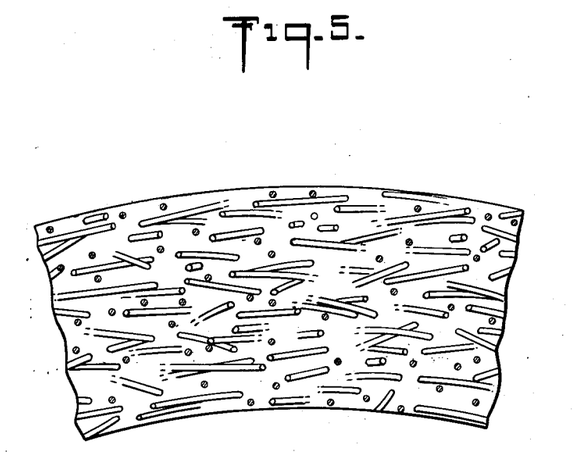
FIGURE 5 is a sectional view through the wall of the casing taken on line 5—5 of FIGURE 4.
Figure 6:
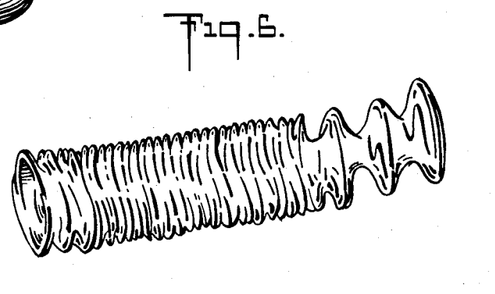
FIGURE 6 illustrates the extruded collagen casing of the present invention in a shirred condition.
Figure 7:
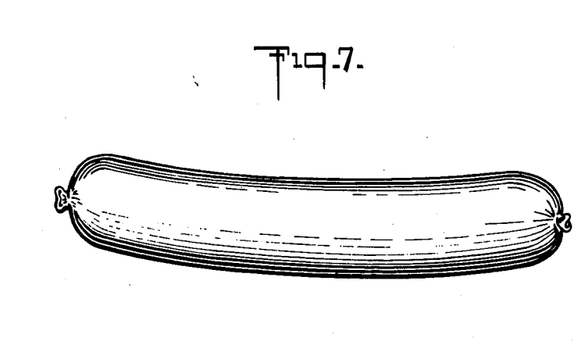
FIGURE 7 illustrates an extruded casing of the present invention, stuffed with sausage.

Extruders of this type can produce a uniform and homogeneous casing in which the collagen fibrils are more or less randomly oriented but lie generally parallel to the surface of the tubular wall. FIGURES 4 and 5 provide a much exaggerated illustration of this type of random arrangement of deswollen collagen fibrils as they appear to exist in the casing wall after the casing leaves the coagulation bath and before the individual fibrils are cohered in the drying chamber.

The coagulating bath may be a 42% solution of technical grade ammonium sulfate in water. This strong salt solution causes the individual collagen fibrils in the extruded casing to lose water and become smaller in diameter so that they are no longer highly swollen. The pH of this bath is preferably adjusted to about 7 with ammonium hydroxide and this coagulating bath and all baths employed throughout the process of the present example to treat the extruded casing are preferably maintained below 25° C.

Figure 3:
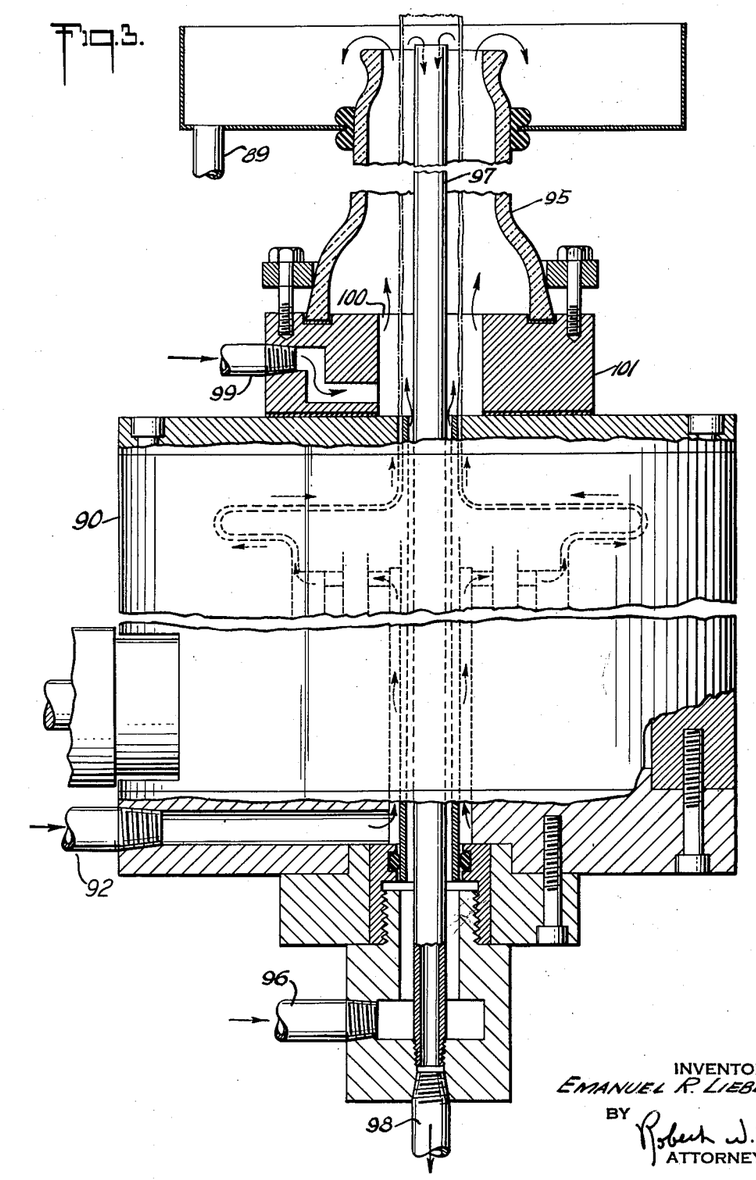
FIGURE 3 is a vertical sectional view illustrating the flow of the dehydrating bath and collagen through an extruder.

It will be noted from FIGS. 1 and 3 that the swollen collagen fibrils are extruded into a coagulating bath recirculating in an enclosed system. The extruded casing tube is pulled vertically upward out of the bath by a driven roller 87, is perforated at 2 inch intervals by the needles 30 mounted on the rotating wheel 31, and enters a coagulating bath of similar composition which is circulated through a tank 88.

The circulation of the coagulating bath through the vertical column 95 in contact with the inner and outer walls of the extruded casing is best illustrated by FIGURE 3. A portion of this bath enters at the bottom of the extruder through a conduit 96 and flows vertically upward within the extruded casing passing between the extruded casing and an overflow tube 97. This liquid returns through the overflow tube 97, which extends to the top of the column, and an exit conduit 98. Another portion of the coagulating bath enters the bottom of the column 95 through a conduit 99 and an annular opening 100 in a distributor 101 that is fixed to the extruder 90. This portion of the dehydrating bath flows vertically upward in the column outside the extruded casing and returns through an overflow drain 89. The flow rate within the extruded casing (through conduit 96) may be about 1 gallon per hour. This inside flow of the dehydrating liquid is most helpful when starting up the extruder. The flow rate outside of the extruded casing (through conduit 99) may be about 2 gallons per minute.

Referring again to FIGURE 1, the driven roller 87 transports the extruded casing through the column 95, whose length is such as to maintain the casing in contact with the bath for about a minute or less. The casing is then perforated and enters an after-bath in tank 88 containing concentrated ammonium sulfate solution from which it emerges after deswelling is substantially completed, e.g., after about 5 minutes.

The casing next enters a more dilute solution of ammonium sulfate 20 contained in the tank 103. Solution 20 is approximately neutral and contains from about 4 to 10% ammonium sulfate. The dwell time in this tank is about 6 minutes, during which time the concentration of salt solution that is occluded by the wet casing is reduced to a value corresponding to the concentration of ammonium sulfate in solution 20. It is necessary to reduce the amount of salt that is present in the casing since the alum solution that is subsequently used to harden the collagen tube will not react with the collagen fibrils in the presence of excessive amounts of ammonium sulfate.

Figure 2:
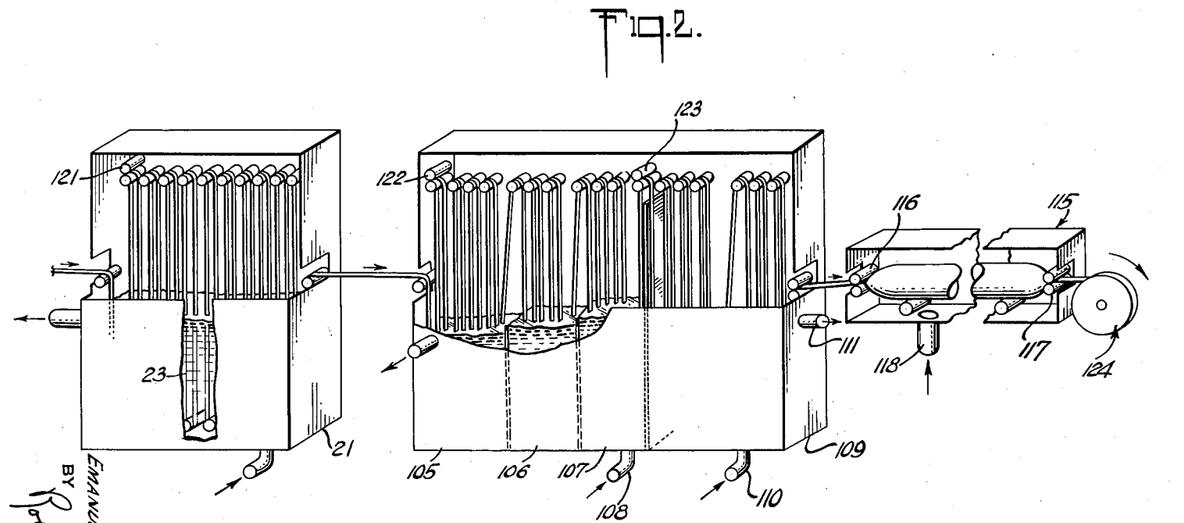

Referring now to FIGURE 2, the collagen casing prior to washing is hardened in tank 21 which contains an alum hardening bath 23. The bath 23 may be a solution of about 12% alum [$NH_4Al(SO_4)_2 \cdot 24H_2O$], about 8% ammonium sulfate and about 2.8% citric acid adjusted to pH 4.3.

Washing takes place in tanks 105, 106, and 107 which conveniently may be separated by side walls of decreasing height. Thus, fresh wash water enters the tank 107 through a conduit 108 and overflows into tank 106 and tank 105. The total washing time is about 14 minutes, which time is sufficient to substantially remove the occluded soluble components. The washed casing then passes into a bath 109, containing a plasticizing agent such as about 6% glycerine in water. The dwell time in this bath is about 5 minutes. The plasticizing bath enters tank 109 through the conduit 110 and overflows through conduit 111.

The excess water is removed from the casing as it travels through the chamber 115. A section of the casing which is within the drying chamber, between rollers 116 and 117, is maintained in an inflated condition with a captive air bubble and forced warm air, e.g., at a temperature of about 60–70° C. enters the drying chamber through conduit 118. The dwell time in the drier 115 is about 9 minutes.

The extruded casing is conveyed through the system by driven rollers 87, 119, 120, 121, 122, 123, 116 and 117 and is collected on a takeup reel 124. The casing may be subjected to further heat treatment at about 80° C. and about 20–30% relative humidity for about 24 hours. This additional heat-curing step may be eliminated if a small amount of formaldehyde (as little as 20 parts per million) is added to the hardening or plasticizing bath. The casing, after this heat-curing step, will contain from about 10% to about 30% by weight of moisture and will pick up additional moisture if allowed to equilibrate at room temperature and humidity. Such casings will stuff satisfactorily if equilibrated at room temperature and a relative humidity of about 75%. To maintain the desired moisture content for stuffing, the so-rehumidified casings are preferably packaged in hermetically sealed containers of metal foil or the like.

Casings made by the method described above are of uniform diameter and wall thickness. The casing wall is a smooth continuous film containing no appreciable proportion of collagen fibers. Dispersed throughout the wall of the casing may be noted fat droplets which apparently are derived from the original unlimed cowhide. The fat droplets may be present in an amount corresponding to from about 2.75% to about 6.25% based on the weight of collagen solids. The collagen fibrils that make up the casing wall cohere to form a membrane having the glass-like quality of a hyaloid membrane, but unlike the hyaloid membrane which is transparent, the collagen membrane is translucent. The collagen fibrils throughout the casing wall lie in a plane that is parallel to the surface of the casing. The cohered collagen fibrils may be either randomly oriented or directionally oriented with respect to the direction of extrusion, depending upon the conditions of extrusion and the extruder used.

Typical casings made by the process described above were tested on an Instron tensile tester to determine certain physical properties. The Instron tensile tester is a machine which can apply a tensile load to a sample and simultaneously record on a moving chart the stress-strain curve of the sample under test. The Instron apparatus employed to obtain the data reported below was adapted to the testing of extruded collagen casings by enclosing the clamps of the instrument in an insulated box which could be filled with live steam to maintain the sample at 99° C. All casings tested were pretreated by soaking in a meat emulsion extract for three minutes. This extract was prepared in the following manner:

A mixture of 1 part by weight ground sausage meat and 2 parts by weight water is mixed thoroughly in a Waring Blendor and the water extract is separated from the meat by filtration. The meat emulsion extract so obtained is heated to the boiling point to coagulate certain water-soluble proteins and then filtered a second time to give a clear yellow solution that is used to pretreat the casings that are to be tested.

A 4-inch length of the casing which has been soaked for 3 minutes in the meat emulsion extract described above is clamped between the jaws of the Instron tensile tester in such a manner that the length of the casing suspended between the two jaws is 3 inches. The jaws of the Instron apparatus are then positioned 1 inch apart and live steam is admitted to the insulated box that surrounds the sample and jaws of the apparatus. The temperature of the casing sample being tested is maintained at 99° C. throughout the entire test procedure.

Figure 8:
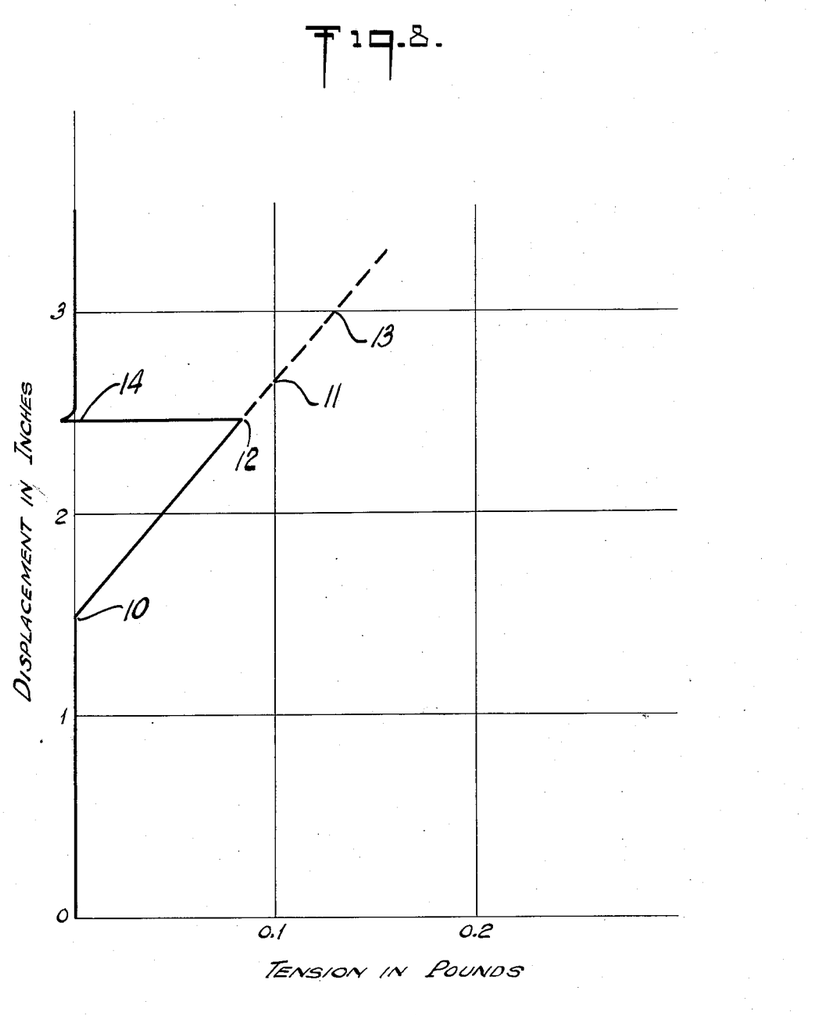
FIGURE 8 is a reproduction of a stress-strain curve of a typical collagen casing of the present invention obtained from an Instron tensile tester machine.

Three minutes after the steam is admitted to the insulated box that surrounds the casing sample being tested, the clamps of the Instron tensile tester are moved apart at the rate of 1 inch per minute until the casing breaks. While the jaws of the apparatus are in motion, the stress or tension exerted by the casing and the distance between the moving jaws is continuously recorded by a moving stylus on graph paper. FIGURE 8 is a reproduction of a typical stress-strain curve from an Instron tensile tester chart. It will be noted that the displacement along the ordinate corresponds to the distance separating the jaws of the machine in inches. The displacement along the abscissa corresponds to the load on the jaws or tension exerted by the casing in pounds.

Five important physical properties of the casing under test can be measured from a single stress-strain curve. It will be noted from FIGURE 8 that no tension is recorded until the clamps have moved 1½ inches apart. This distance from the intersection of the X axis and the Y axis (no displacement to point 10 is a measure of the length of the casing after steaming for 3 minutes and the original length (3 inches) minus the distance from the point of origin to point 10, is the change of length due to shrinkage, which throughout this specification will be referred to as ΔL. In FIGURE 8, ΔL is equal to 3 inches minus 1½ inches or 1½ inches.

From the slope of the line 10—11 in FIGURE 8, it will be noted that the strain in inches per pound of stress is 11.5. This value, which is related to the reciprocal of Young's modulus, will be referred to throughout the specification as $\epsilon$.

In FIGURE 8, point 12 indicates the sudden breaking of the casing, the tension dropping suddenly to zero. The point 12 is a measure of the tension or applied force at the break point. The casing having the stress-strain curve illustrated in FIGURE 8 snapped under an applied force of 0.08 pound. The force required to break the casing under the test conditions described above will be referred to throughout this specification as the hot tensile strength.

If the stylus trace 10—12 of FIGURE 8 is extended as indicated by the dotted line to the point 13, at which point the distance between the clamps is equal to the original length of the casing suspended between the clamps (3 inches), the displacement of this point 13 from the Y axis is a measure of the tension that would be exerted had the casing been stretched to its original length before breaking. This force, which in the test illustrated by FIGURE 8 amounts to 0.13 pound, will be referred to throughout this specification as the shrink tension.

The line 12—14 of FIGURE 8 intersects the Y axis at 2.45 inches, indicating that the casing measured 2.45 inches in length just prior to breaking. The length of the casing at the break point divided by the original length of the casing suspended between the clamps and multiplied by 100 (2.45 inches ÷ 3 inches × 100), will be referred to throughout the present specification as the percent recovery. In the test illustrated by FIGURE 8, the percent recovery of the casing was 82.

Typical casings of the present invention have had the following illustrative properties when tested on an Instron tensile tester as described above.

The change of length due to shrinkage ΔL amounts to from about 1.0 inch to about 2.0 inches.

The strain in inches per pound of stress, $\epsilon$, is from about 2.0 to about 20.0 inch-pounds.

The hot tensile strength is from about 0.1 pound to about 1.0 pound.

The shrink tension is from about 0.08 to about 0.50 pound.

The percent recovery amounts to from about 81 to about 150.

The burst strength is at least about 10 to 28 pounds per square inch. Burst strength is the air pressure in pounds per square inch required to burst dry extruded collagen casings having a wall thickness of 1 mil. The values of burst strength expressed in this specification are determined in a Perkins Mullen tester (Model C). Liquid under uniformly increasing pressure expands against a distensible rubber diaphragm and, simultaneously, into a Bourdon pressure gauge. The material to be tested is clamped securely to a metal plate through which the diaphragm is free to expand through a circular opening against one square inch of its surface. As the sample distorts under pressure, the diaphragm assumes the exact contour of the material, uniformly distributes the pressure over the entire test area, and protrudes into any imperfection or weak section to burst or rupture it at that point. When the pressure drops at the moment of rupture, a maximum hand on the gauge remains stationary to indicate the exact pressure at the time the burst occurred.

EXAMPLE III

The swollen collagen mass obtained as in Example I is forced through a 7-mil filter screen and extruded into column 95 in the form of a tube. This extruded tube of swollen collagen fibrils is coagulated for 6 minutes in an aqueous ammonium sulfate bath containing 40% ammonium sulfate adjusted to a pH of 7.0 with sodium hydroxide and is then prewashed for an equal period of time in 15% ammonium sulfate similarly adjusted to pH 6.5.

Alum hardening of this extruded casing is accomplished by treatment with an alum solution containing 6% alum $[NH_4Al(SO_4)_2 \cdot 24H_2O]$, 1% citric acid and 4% ammonium sulfate. The contact time is 6 minutes and this alum tanning solution is maintained at pH 4.3. After the tanning step, the casing is washed in tap water for 14 minutes using two complete changes of water in the tank 104. The casing is finally passed through a bath 109 containing 3.6% glycerol, 20 parts per million formaldehyde and 0.1% sodium bicarbonate. The dwell time in this bath is 5 minutes. After the casing has been plasticized, it is inflated and dried for 9 minutes in a rapid stream of air at 80° C. and 8% relative humidity.

The casing is next treated with an aqueous suspension containing 15% of a commercial grade of powdered egg white and 10% glycerine. This suspension is applied on the interior wall surface of the casing at the rate of 1.4 milliliters per foot of casing treated and the casing is then inflated and dried for 9 minutes in a rapidly moving stream of air at 80° C. and 8% relative humidity.

A typical dried, tanned and plasticized casing made in accordance with the procedure described in this example had a substantially uniform cross-section along its major axis. The variation in diameter was less than 5% from the mean throughout the length of the casing. The examination of a typical casing under an optical microscope showed a large number of fat droplets evenly dispersed throughout the wall of the casing. Some of the fat droplets observed had a diameter about equal to the wall thickness of the casing, which was 0.95 mil. The burst strength of the casing was 16 pounds per square inch. The physical properties determined by testing four samples of this casing on an Instron tensile tester by the procedure described above and averaging the results were as follows:

| | |
|---|---|
| ΔL _______________________________inches__ | 1.55 |
| ε _______________________________inch-pounds__ | 3.80 |
| Hot tensile strength _______________pounds__ | 0.339 |
| Shrink tension ___________________do____ | 0.404 |
| Percent recovery _________________________ | 93 |

The extruded casing had a uniform wall thickness and numerous consecutive measurements of the absolute burst strength did not vary from the mean of these measurements by more than 10%. The product could be shirred, stuffed and linked without difficulty and cooked without undue shrinkage. An analysis of this casing indicated the presence of 0.41% aluminum calculated as aluminum metal.

EXAMPLE IV

A homogeneous mass of swollen collagen fibrils (4% hide solids and 0.88% lactic acid) prepared as described in Example I above, is filtered through a 7-mil filter screen and extruded in the form of a tube using a disk extruder of the type described and claimed in co-pending application filed as of even date herewith (Ethicon 149), Serial No. 82,933, filed January 16, 1961.

This extruded collagen tube of swollen collagen fibrils is coagulated for 6 minutes in an aqueous ammonium sulfate bath containing 40% ammonium sulfate adjusted to pH 7.0 with ammonium hydroxide and is then prewashed for an equal period of time in 15% ammonium sulfate similarly adjusted to pH 6.5.

Alum hardening of this extruded casing is accomplished by immersion in a solution containing 3% alum [$NH_4Al(SO_4)_2 \cdot 24H_2O$], 0.5% citric acid and 10% ammonium sulfate. The contact time is 6 minutes and the pH is maintained at 4.3. After the hardening step, the casing is washed in tap water for 14 minutes with two changes of water. The casing is finally plasticized by passing it through a bath containing 3.6% glycerol. The dwell time in this bath is 5 minutes. After the casing has been plasticized with glycerol, it is inflated and dried for 9 minutes in a rapidly moving stream of air at 80° C. and 8% relative humidity. The resulting product is a translucent non-fibrous casing of cohered collagen fibrils.

Twenty-five foot lengths of the casing are treated with an aqueous suspension containing 15% of a commercial grade of powdered egg white and 10% glycerol by passing this suspension through the casing and the casing is inflated with air and hung up for 30 minutes at room temperature to air-dry. The albumin-glycerol treated casings are then heat-cured in a forced draft oven at 72° C. and 27% relative humidity for 24 hours.

A typical product having been made in accordance with this example had a wall thickness of 0.8 mil and a burst strength of 12 pounds per square inch. The physical properties determined by testing four samples of this casing on an Instron tensile tester by the procedure described above and averaging the results were as follows:

| | |
|---|---|
| ΔL _______________________________inches__ | 1.67 |
| ε _______________________________inch-pounds__ | 9.08 |
| Hot tensile strength _______________pounds__ | 0.226 |
| Shrink tension ___________________do____ | 0.159 |
| Percent recovery _________________________ | 118 |

This product could be shirred, stuffed and linked without difficulty and cooked satisfactorily without undue shrinkage. An analysis of this casing indicated the presence of 0.35% aluminum or 5.9% alum calculated as $NH_4Al(SO_4)_2 \cdot 24H_2O$.

EXAMPLE V

A homogeneous mass of swollen collagen fibrils (4% hide solids and 1.2% lactic acid) prepared as described in Example I above, is filtered through a 7-mil filter screen and extruded in the form of a tube. This extruded tube of swollen collagen fibrils is coagulated for 6 minutes in an aqueous ammonium sulfate bath containing 40% ammonium sulfate adjusted to pH of 7.0 with ammonium hydroxide and is then prewashed for an equal period of time in 15% ammonium sulfate similarly adjusted to pH 6.5.

Alum hardening of this extruded casing is accomplished by immersion in a solution containing 3% alum [$NH_4Al(SO_4)_2 \cdot 24H_2O$], 0.5% citric acid and 10% ammonium sulfate. The contact time is 6 minutes and this alum tanning solution is maintained at pH 4.3. After the tanning step, the casing is washed in tap water for 14 minutes using two changes of water. The casing is finally plasticized by passing it through a bath containing 6.0% glycerol, 5% of a commercial grade of powdered egg white and 0.3% low viscosity carboxymethyl cellulose. The carboxymethyl cellulose had a viscosity of 25–50 cps. in 2% aqueous solution at 25° C. as determined by a Brookfield viscosimeter and the degree of substitution is 0.75. This cellulose derivative is stated to have about one-quarter of the three available anhydroglucose units substituted with carboxymethyl groups. The dwell time in this bath is 5 minutes. The casing is then rinsed for 1 minute, by passing it through a water bath. After the casing has been washed, it is inflated and dried at 80° C. and 8% relative humidity for 9 minutes. The dried casing is then heat-cured in a forced draft oven at 72° C. and 27% relative humidity for 24 hours.

A typical casing so obtained had a wall thickness of 1.0 mil and a burst strength of 22 pounds per square inch. The physical properties determined by testing four samples of this casing on an Instron tensile tester by the procedure described above and averaging the results were as follows:

| | |
|---|---|
| ΔL _______________________________inches__ | 1.56 |
| ε _______________________________inch-pounds__ | 5.53 |
| Hot tensile strength _______________pounds__ | 0.291 |
| Shrink tension ___________________do____ | 0.265 |
| Percent recovery _________________________ | 104 |

This product stuffed and linked satisfactorily and cooked satisfactorily without excessive shrinkage.

EXAMPLE VI

A homogeneous mass of swollen collagen fibrils (3.7% hide solids and 1.2% lactic acid) prepared as described in Example I above is filtered through a 7-mil filter screen and extruded in the form of a tube in such a way as to impart some collagen fibril orientation transverse to the direction of extrusion.

The extruded collagen tube of swollen collagen fibrils is coagulated for 6 minutes in an aqueous ammonium sulfate bath containing 40% ammonium sulfate adjusted to pH 7 with ammonium hydroxide and then prewashed for 2 minutes in 4% ammonium sulfate similarly adjusted to pH 6.5.

Alum hardening of this extruded casing is accomplished by immersion in the alum solution of the composition described below in Table I. The contact time is 5 minutes and the pH is maintained at the point indicated in Table I. After the tanning step, the casing is washed for 30 minutes in tap water. The casing is next plasticized by passing it through a bath containing 6% glycerol, the dwell time being 2 minutes. After the casing has been plasticized with glycerol, it is inflated and air-dried. A sample of each casing so prepared is heat-cured in a forced draft oven at 80° C. and 27% relative humidity for 24 hours. The physical characteristics of typical casings so produced are tabulated in Table I. It will be noted that the odd numbered experiments relate to products that had not been heat-cured.

then prewashed for an equal period of time in 16% ammonium sulfate similarly adjusted to approach neutral-

TABLE I

| | Tanning Bath | | | pH | Wet Strength (grams) | Burst Strength | ΔL | Shrink Tension | Percent Recovery | Hot Tensile Strength | ε | Heat Cured |
|---|---|---|---|---|---|---|---|---|---|---|---|---|
| | Percent Alum | Percent (NH₄)₂SO₄ | Percent Citric Acid | | | | | | | | | |
| 1 | 18 | 8 | 4.2 | 4.3 | 431.2 | 22 | 2.0 | 0.113 | 89 | 0.086 | 18.0 | No. |
| 2 | 18 | 8 | 4.2 | 4.3 | 431.2 | 17 | 1.67 | 0.192 | 114 | 0.297 | 7.95 | Yes. |
| 3 | 18 | 8 | 4.2 | 5.0 | 278.7 | 17 | 2.0 | 0.105 | 91 | 0.081 | 19.1 | No. |
| 4 | 18 | 8 | 4.2 | 5.0 | 278.7 | 24 | 1.63 | 0.162 | 98 | 0.155 | 9.37 | Yes. |
| 5 | 12 | 8 | 2.8 | 4.3 | 320.0 | 28 | 2.0 | 0.106 | 89 | 0.078 | 19.0 | No. |
| 6 | 12 | 8 | 2.8 | 4.3 | 320.0 | 16 | 1.58 | 0.224 | 103 | 0.233 | 6.60 | Yes. |
| 7 | 12 | 8 | 2.8 | 5.0 | 263.7 | 20 | 2.0 | 0.105 | 89 | 0.076 | 19.4 | No. |
| 8 | 12 | 8 | 2.8 | 5.0 | 263.7 | 20 | 1.57 | 0.184 | 123 | 0.324 | 7.63 | Yes. |
| 9 | 6 | 4 | 1.4 | 3.5 | 222.5 | 18 | 2.0 | 0.107 | 76 | 0.059 | 18.9 | No. |
| 10 | 6 | 4 | 1.4 | 3.5 | 222.5 | 22 | 1.59 | 0.265 | 104 | 0.307 | 5.68 | Yes. |
| 11 | 6 | 4 | 1.4 | 4.3 | 220.0 | 16 | 2.0 | 0.111 | 84 | 0.076 | 18.5 | No. |
| 12 | 6 | 4 | 1.4 | 4.3 | 220.0 | 11 | 1.64 | 0.249 | 108 | 0.318 | 6.33 | Yes. |
| 13 | 6 | 4 | 1.4 | 5.0 | 230.0 | 16 | 2.00 | 0.115 | 81 | 0.073 | 17.8 | No. |
| 14 | 6 | 4 | 1.4 | 5.0 | 230.0 | 20 | 1.55 | 0.269 | 118 | 0.455 | 6.15 | Yes. |

The even numbered products had all been heat-cured for 24 hours at 80° C. and 27% relative humidity.

EXAMPLE VII

The products of the present invention may be modified by mixing cellulose fibers, e.g., soft-wood fibers or hard-wood fibers, into the swollen cowhide collagen fibrils that are used as a starting material. These fibers may range from about 9000 to 70,000 angstroms in diameter and from about 23,000 angstroms to 400 microns in length. Unlike collagen fibers which would adversely effect the stuffing, linking and cooking properties of the collagen casings of the present invention, these foreign cellulosic fibers have no such effect. While this modification of the present invention is not to be limited by a particular theory, it is believed that these foreign fibers are encapsulated in a matrix of cohered collagen fibrils and behave differently from collagen fibers because apparently there is no adhesion between the foreign fiber and the adjacent matrix of cohered collagen fibrils. In any event, cellulosic fibers having the dimensions described above may be present in the final casing. Casings that contain from about 10% to 20% by weight of such cellulose fibers have been found to be satisfactory.

Forty-six kilograms of fresh frozen steer hides, from which the hair and epidermal layer has been previously removed by a leather splitting machine, are defrosted and cut into 1-inch squares. The hide squares are passed through a meat grinder using hole sizes of ¾ inch, ⅜ inch and 3/16 inch. The finely ground hide corium is then blended with a dispersion of 2 kilograms of soft-wood cellulose fibers in 75 liters of water. The hide-cellulose-water mixture is then blended with 3.2 kilograms of 88% lactic acid and sufficient water to bring the total weight of the final mixture up to 240 kilograms. The mixture so obtained has the following composition:

| | Percent |
|---|---|
| Hide solids | 4.0 |
| Soft-wood cellulose fibers | 0.8 |
| Lactic acid | 1.2 |
| Water | 94.0 |

After a swelling period of at least 3 hours, the mixture is further dispersed in a suitable homogenizer fitted with a 2-stage valve and operated with a 1500 p.s.i. drop per stage. The mixture of swollen collagen fibrils and cellulose fibers so obtained is deaerated under vacuum, forced through an 8 mil x 40 mil stainless steel screen filter and extruded at the approximate rate of 13 feet per minute in the form of a tube using a disk extruder of the type described and claimed in co-pending application filed as of even date herewith (Ethicon 149), Serial No. 82,933, filed January 16, 1961. This extruded tube is coagulated for 6 minutes in an aqueous ammonium sulfate bath having a specific gravity of 1.215 (approximately 36–40% ammonium sulfate), adjusted to pH 7.5 and is then prewashed for an equal period of time in 16% ammonium sulfate similarly adjusted to approach neutrality. Hardening of this extruded casing is accomplished by immersion in a solution containing 3% alum $$[NH_4Al(SO_4)_2 \cdot 24H_2O]$$

0.6% citric acid and 6% ammonium sulfate. The contact time is 10 minutes and the pH is maintained at 4.7.

After the hardening step, the casing is washed with tap water for 35 minutes and plasticized by passing it through a solution containing 3 volume-percent glycerol and 0.8 weight-percent of low viscosity carboxymethyl cellulose. The pH of this plasticizing bath is 6.5 and the dwell time is about 9 minutes. The plasticized casing is inflated and dried for 9 minutes in a rapidly moving stream of air at about 80° C. This product is heat-cured by increasing the temperature from 25° C. to 80° C. during an 8-hour period and then maintaining the temperature at 80° C. for an additional 24 hours.

Typical casings obtained by the procedure described in this example had a wall thickness of 1.1 mils and a dry burst strength of 16 pounds per square inch. The physical properties determined by testing four samples of this casing on an Instron tensile tester by the procedure described above and averaging the results were as follows:

| | |
|---|---|
| ε ________________________________ inch-pounds__ | 4.5 |
| Hot tensile strength ______________________ pounds__ | 0.685 |
| Shrink tension __________________________ do____ | 0.32 |
| Percent recovery _________________________ | 121 |

Seven pieces of casing, each about 20 feet in length were stuffed with sausage using a Buffalo 300-pound stuffer. The stuffed casing was linked on a Famco linking machine. No linking failures were noticed and the cooking response of the stuffed sausages so obtained was satisfactory.

EXAMPLE VIII

A mixture of swollen collagen fibrils and hard-wood cellulose fibers having the following composition:

| | Percent |
|---|---|
| Hide solids | 4.0 |
| Hard-wood cellulose | 0.8 |
| Lactic acid | 1.2 |
| Water | 94.0 | is prepared by the procedure described above in Example VII. This material is extruded in the form of a tube at the approximate rate of 13 feet per minute using a disk extruder of the type described and claimed in co-pending application filed as of even date herewith Ethicon 149), Serial No. 82,933, filed January 16, 1961. This extruded tube is coagulated for 6 minutes in an aqueous ammonium sulfate bath having a specific gravity of 1.200 (approximately 36–40% ammonium sulfate), adjusted to pH 7.5, and is then prewashed for an equal period of time in 16% ammonium sulfate similarly adjusted to approach neutrality. Hardening of this extruded casing is accomplished by immersion in a solution containing 3% alum [$NH_4Al(SO_4)_2 \cdot 24H_2O$], 0.6% citric acid and 6% ammonium sulfate. The contact time is 10 minutes and this pH is maintained at 4.35.

After the hardening step, the casing is washed with tap water for 35 minutes and plasticized by passing it through a solution containing 3 volume-percent glycerol and 0.8 weight-percent of low viscosity carboxymethyl cellulose. The pH of this plasticizing bath is 6.5 and the dwell time is about 9 minutes. The plasticized casing is inflated and dried for 9 minutes in a rapidly moving stream of air at about 80° C. This product is heat-cured by increasing the temperature from 25° C. to 80° C. during an 8-hour period and then maintaining the temperature at 80° C. for an additional 24 hours. After the heat-curing step, the inside of the casing is dusted with dry egg albumin prior to stuffing.

Typical casings so obtained had a wall thickness of 1.0 mil. The physical properties as determined by testing four samples of this casing on an Instron tensile tester by the procedure described above and averaging the results were as follows:

| | |
|---|---|
| $e$ inch-pounds | 4.5 |
| Hot tensile strength pounds | 0.402 |
| Shrink tension do | 0.305 |
| Percent recovery | 105 |

The product could be shirred, stuffed and linked without difficulty and cooked without undue shrinkage.

The invention described and illustrated hereinbefore and secured by these Letters Patent is defined in the following patent claims.

What is claimed is:

1. An edible translucent sausage casing free of collagen fibrous membrane comprising cohered unlimed hide collagen fibrils.

2. The sausage casing of claim 3 in a shirred condition.

3. The casing of claim 2 which can be stuffed in the dry state.

4. An edible article essentially free of collagen fibers comprising cohered unlimed hide collagen fibrils and characterized by the presence throughout said article of from 2.75% to 6.25% by weight of small dispersed fat droplets.

5. An edible article according to claim 4 wherein the fat droplets are encapsulated in a matrix of unlimed hide collagen fibrils cohered to form a translucent hyaloid structure.

6. An edible article comprising 10 to 20 percent of a non-collagenous fibrous material encapsulated in a matrix of unlimed hide collagen fibrils cohered to form a translucent hyaloid structure.

7. An edible article according to claim 6 wherein the non-collagenous fibrous material is wood fibers.

8. An edible non-fibrous article comprising cohered unlimed hide collagen fibrils, said fibrils lying generally parallel to the surface of the article.

9. An edible sausage comprising a collagen tube of cohered unlimed hide collagen fibrils, said collagen tube being filled with an edible meat product which adheres to the interior surface of the tube, whereby during subsequent cooking the meat product is not extruded from said tube.

10. The process of manufacturing an edible collagen casing that is substantially free of collagen fibers which includes the steps of:

Causing from 2.5% to 6% by weight of unlimed cowhide to swell in a dilute aqueous solution of a nontoxic acid at a temperature below 25° C. until the sheaths that surround the collagen fibers are ruptured, thereby liberating swollen collagen fibrils;

Extruding the swollen collagen fibrils so obtained in the form of a tube into a coagulating bath, thereby deswelling the collagen fibrils;

Treating the deswollen collagen fibrils with an alum solution;

Washing the deswollen collagen fibrils to remove occluded salts;

Air-drying the collagen fibrils whereby said fibrils cohere to form a translucent hyaloid tubular wall; and Heat curing the product so obtained.

11. The process of manufacturing an edible collagen casing that is substantially free of collagen fibers which includes the steps of:

Adding from 2½% to 6% by weight of comminuted unlimed cowhide to an aqueous 1.2% lactic acid solution having a temperature below 25° C., thereby causing the cowhide to swell and rupture the sheaths surrounding the collagen fibrils;

Extruding the swollen collagen fibrils so obtained in the form of a tube;

Deswelling the swollen collagen fibrils by immersing said tube in a solution of ammonium sulfate;

Hardening the collagen tube by contacting the same with a solution of alum;

Washing the collagen tube with water;

Inflating the collagen tube with air and drying said tube while in the inflated condition with the current of air heated to a temperature between 60° C. and 70° C.;

Shirring a length of said tube; and

Heat curing the dried and shirred collagen tube by gradually raising the temperature to 80° C. and thereafter maintaining said temperature for an extended period of time.

References Cited in the file of this patent

UNITED STATES PATENTS

| | | |
|---|---|---|
| 1,616,971 | Henderson | Feb. 8, 1927 |
| 2,485,957 | Cresswell | Oct. 25, 1949 |
| 2,747,228 | Braun et al. | May 29, 1956 |
| 2,803,042 | Lundh | Aug. 20, 1957 |
| 2,988,451 | Zahn | June 13, 1961 |
| 3,071,477 | Klevens | Jan. 1, 1963 |

UNITED STATES PATENT OFFICE
CERTIFICATE OF CORRECTION

Patent No. 3,123,482                                                    March 3, 1964

Emanuel Roy Lieberman

It is hereby certified that error appears in the above numbered patent requiring correction and that the said Letters Patent should read as corrected below.

Column 13, line 36, for "fibrous membrane" read -- fibers and --; same column, line 38, for the claim reference numeral "3" read -- 1 --.

Signed and sealed this 14th day of July 1964.

(SEAL)

Attest:

ESTON G. JOHNSON                                          EDWARD J. BRENNER
Attesting Officer                                               Commissioner of Patents